(12) United States Patent
Abdo et al.

(10) Patent No.: US 7,640,245 B1
(45) Date of Patent: Dec. 29, 2009

(54) SYSTEM AND METHOD FOR AUDITING A NETWORK SERVER CONFIGURATION

(75) Inventors: Ralph Abdo, Sammamish, WA (US); Aaron Tarzan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 335 days.

(21) Appl. No.: 10/863,925

(22) Filed: Jun. 8, 2004

(51) Int. Cl.
*G06F 17/30* (2006.01)
(52) U.S. Cl. .............................. 707/10; 726/25; 707/200
(58) Field of Classification Search ...................... 707/1, 707/10, 200; 726/25
See application file for complete search history.

(56) References Cited

U.S. PATENT DOCUMENTS

2003/0163488 A1* 8/2003 Kloos et al. ................. 707/200
2005/0257267 A1* 11/2005 Williams et al. .............. 726/25

OTHER PUBLICATIONS

Jeffrey N. Mason et al.; "Gathering Client-server Data"; *Internal Auditor*, vol. 58, No. 6; 2001; pp. 27-29.

* cited by examiner

*Primary Examiner*—Hosain T Alam
*Assistant Examiner*—Johnese Johnson
(74) *Attorney, Agent, or Firm*—Merchant & Gould. P.C.

(57) ABSTRACT

A web server configuration is audited by selecting a configuration file and a set of target servers to be audited. The configuration file includes configuration settings to be audited for, and expected values for the configuration settings. The configuration file may be reconfigured by a user to include appropriate configuration settings and expected values. The configuration settings and expected values are compared to actual values of the configuration settings for the target server. Audit results are determined based on the comparison. The results are included in a report with the corresponding configuration settings.

22 Claims, 6 Drawing Sheets

```xml
<?xml version="1.0" ?>
- <MBProperty>
    <IIsNntpService Category="IIS Services" IsAllowed="False" />
    <IIsFtpService Category="IIS Services" IsAllowed="False" />
    <IIsSmtpService Category="IIS Services" IsAllowed="False" />
  - <IIsWebService Category="IIS Services" IsAllowed="True">
      <AppAllowClientDebug Data="String">FALSE</
        AppAllowClientDebug>
      <AppAllowDebugging Data="String">FALSE</
        AppAllowDebugging>
      <AppAllowClientDebug Data="String">FALSE</
        AppAllowClientDebug>
      <AppPoolId Data="String">DefaultAppPool</AppPoolId>
      <AspEnableParentPaths Data="String">FALSE</
        AspEnableParentPaths>
      <AspKeepSessionIDSecure Data="String">1</
        AspKeepSessionIDSecure>
      <AspLogErrorRequests Data="String">TRUE</
        AspLogErrorRequests>
      <AspScriptErrorSentToBrowser Data="String">FALSE</
        AspScriptErrorSentToBrowser>
      <AuthFlags Data="String">AuthAnonymous | AuthNTLM</
        AuthFlags>
      <IsapiRestrictionList Data="String">0</IsapiRestrictionList>
      <LogType Data="String">1</LogType>
      <InProcessIsapiApps Data="Info" />
      <ScriptMaps Data="Info" />
      <AnonymousUserName Data="String">domain\user</
        AnonymousUserName>
      <DefaultDoc Data="Info" />
    </IIsWebService>
  - <IIsWebServer Category="Web Servers" IsAllowed="True">
      <AccessFlags Data="String">AccessRead | AccessScript</
        AccessFlags>
    </IIsWebServer>
  - <IIsWebVirtualDir Category="Virtual Directorys" IsAllowed="True">
      <AccessFlags Data="String">AccessRead | AccessScript</
        AccessFlags>
      <AppPoolId Data="String">DefaultAppPool</AppPoolId>
      <DontLog Data="String">FALSE</DontLog>
      <HttpErrors Data="Info" />
      <AuthFlags Data="String">AuthAnonymous</AuthFlags>
    </IIsWebVirtualDir>
  </MBProperty>
```

*Fig. 3*

- <MBProperty>
    <IIsMimeMap Location="/LM/MimeMap" MimeMap="..." />
    - <IIsWebService Location="/LM/W3SVC" AllowKeepAlive="TRUE"
    .
    .
    .
    </IIsWebService>
    <IIsWebServer Location="/LM/W3SVC/1" AppPoolId="DefaultAppPool".../>
    <IIsFilters Location="/LM/W3SVC/1/Filters".../>
    <IIsCertMapper Location="/LM/W3SVC/1/IIsCertMapper" />
    <IIsWebVirtualDir Location="/LM/W3SVC/1/ROOT".../>
    <IIsWebDirectory Location="/LM/W3SVC/1/ROOT/aspnet_client".../>
    <IIsApplicationPools Location="/LM/W3SVC/AppPools".../>
    <IIsApplicationPool Location="/LM/W3SVC/AppPools/DefaultAppPool" />
    <IIsFilters Location="/LM/W3SVC/Filters".../>
    <IIsFilter Location="/LM/W3SVC/Filters/ASP.NET_1.1.4322.573".../>
    <IIsFilter Location="/LM/W3SVC/Filters/Compression" />
    <IIsCompressionScheme Location="/LM/W3SVC/Filters/Compression/
        deflate".../>
    <IIsCompressionScheme Location="/LM/W3SVC/Filters/Compression/gzip".../>
    <IIsCompressionSchemes Location="/LM/W3SVC/Filters/Compression/
        Parameters".../>
    - <IIsWebInfo Location="/LM/W3SVC/Info".../>
        <Custom Name="MD_SERVER_CAPABILITIES" ID="1103"
            Value="80831" Type="DWORD" UserType="IIS_MD_UT_SERVER"
            Attributes="INHERIT" />
    </IIsWebInfo>
    <IIsConfigObject Location="/LM/W3SVC/Info/Templates" />
    <IIsWebServer Location="/LM/W3SVC/Info/Templates/Public Web Site"
        ServerComment="Allows all users to browse static and dynamic content." />
    <IIsWebVirtualDir Location="/LM/W3SVC/Info/Templates/Public Web Site/
        Root" AccessFlags="AccessRead | AccessScript"
        AuthFlags="AuthAnonymous" IPSecurity="" />
    <IIsWebServer Location="/LM/W3SVC/Info/Templates/Secure Web Site"
        ServerComment="Allows users with a Windows account to view static and
        dynamic content." />
    <IIsWebVirtualDir Location="/LM/W3SVC/Info/Templates/Secure Web Site/
        Root" AccessFlags="AccessRead | AccessScript" AuthFlags="AuthBasic |
        AuthNTLM | AuthMD5" IPSecurity="" />
</MBProperty>

SYSTEM AND METHOD FOR AUDITING A NETWORK SERVER CONFIGURATION

BACKGROUND OF THE INVENTION

A computer network includes servers that provide service to connected computing devices. The network may be audited for information related to the servers and the computing devices. For example, an administrator may desire to determine proper web server configuration or whether the network withstands security breach attempts. In a conventional system, server configuration information may be obtained by using an auditing application. The auditing application collects server configuration data for all servers on a network. Typically, the auditing application collects configuration data for all servers even though the administrator does not require information about all the servers. Auditing servers unnecessarily that are not targeted may disrupt network operations, especially if the server is in an operative state. A typical auditing application does not allow a user to customize the configuration settings to be audited.

SUMMARY OF THE INVENTION

A web server configuration is audited by selecting a configuration file and a set of target servers to be audited. The configuration file includes configuration settings to be audited for, and expected values for the configuration settings. The configuration file may be reconfigured by a user to include appropriate configuration settings and expected values. The configuration settings and expected values are compared to actual values of the configuration settings for the target server. Audit results are determined based on the comparison. The results are included in a concurrently generated report with the corresponding configuration settings.

According to one aspect, a computer-implemented method audits a web server configuration. A user selects a set of configuration settings, expected values associated with the configuration settings, and a target server. Metadata associated with the target server is compared to the set of selected configuration settings and expected values. The metadata includes settings and values associated with the target server. An output is produced based upon the comparison. The output includes a pass/fail representation of whether the selected configuration settings and expected values match the settings and values associated with the target server.

According to another aspect, a system for auditing a web server configuration includes a target server, a configuration file, an auditor, and a reporting engine. The target server is a server to be audited in the web server configuration. The target server includes metadata for settings and values associated with the target server. The configuration file includes a set of configuration settings and expected results for the target server. The auditor compares the metadata to the set of configuration settings and expected results. The reporting engine produces an output based upon the comparison. The output includes a pass/fail representation of whether the selected configuration settings and expected results match the settings and values associated with the target server.

BRIEF DESCRIPTION OF THE DRAWINGS

FIG. 3 illustrates an example configuration file, in accordance with the present invention.

FIG. 4 illustrates a portion of an example metabase, in accordance with the present invention.

DETAILED DESCRIPTION OF THE PREFERRED EMBODIMENT

Briefly described, a web server configuration is audited by selecting a configuration file and a set of target servers to be audited. The configuration file includes configuration settings for a server and expected values for the configuration settings. The configuration file may be reconfigured by a user to include appropriate configuration settings and expected values. The configuration settings and expected values are compared to actual values of the configuration settings for the target server. Audit results are determined based on the comparison. The results are included in a concurrently generated report with the corresponding configuration settings.

Illustrative Operating Environment

Figure 1:
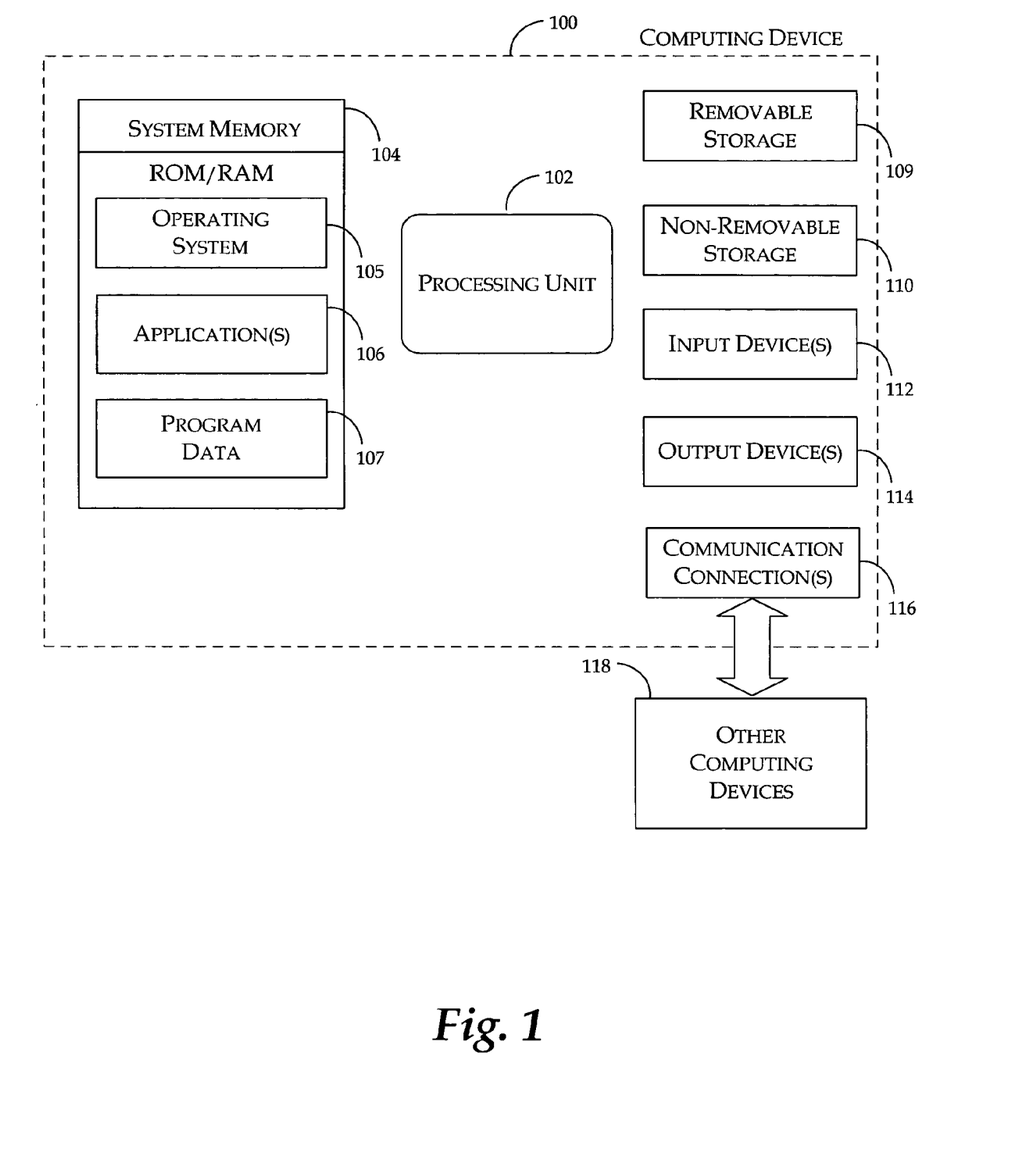
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. The present invention, which is described in detail below, is implemented within system memory 104.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Auditing a Web Server Configuration

A web server is configured to operate in accordance with specifications for an environment to which the server belongs. For example, a server that outputs confidential information to a network browser is configured to prevent unauthorized access to the information. The configuration settings that prevent the browser from opening to a public network may be audited to determine whether the server behaves as expected. The configuration settings for the server are established and stored in a configuration file. The configuration file may be edited such that a user (e.g., an administrator) may select a customized set of configuration settings for auditing and establish an expected value for the configuration settings. The results of the audit determine the actual web server configuration. Actual configuration setting values are compared to the expected values to determine if the server behaved as expected. A report of the audit results may be generated "on-the-fly" that indicates whether a configuration setting passed or failed with respect to the expected results.

Figure 2:
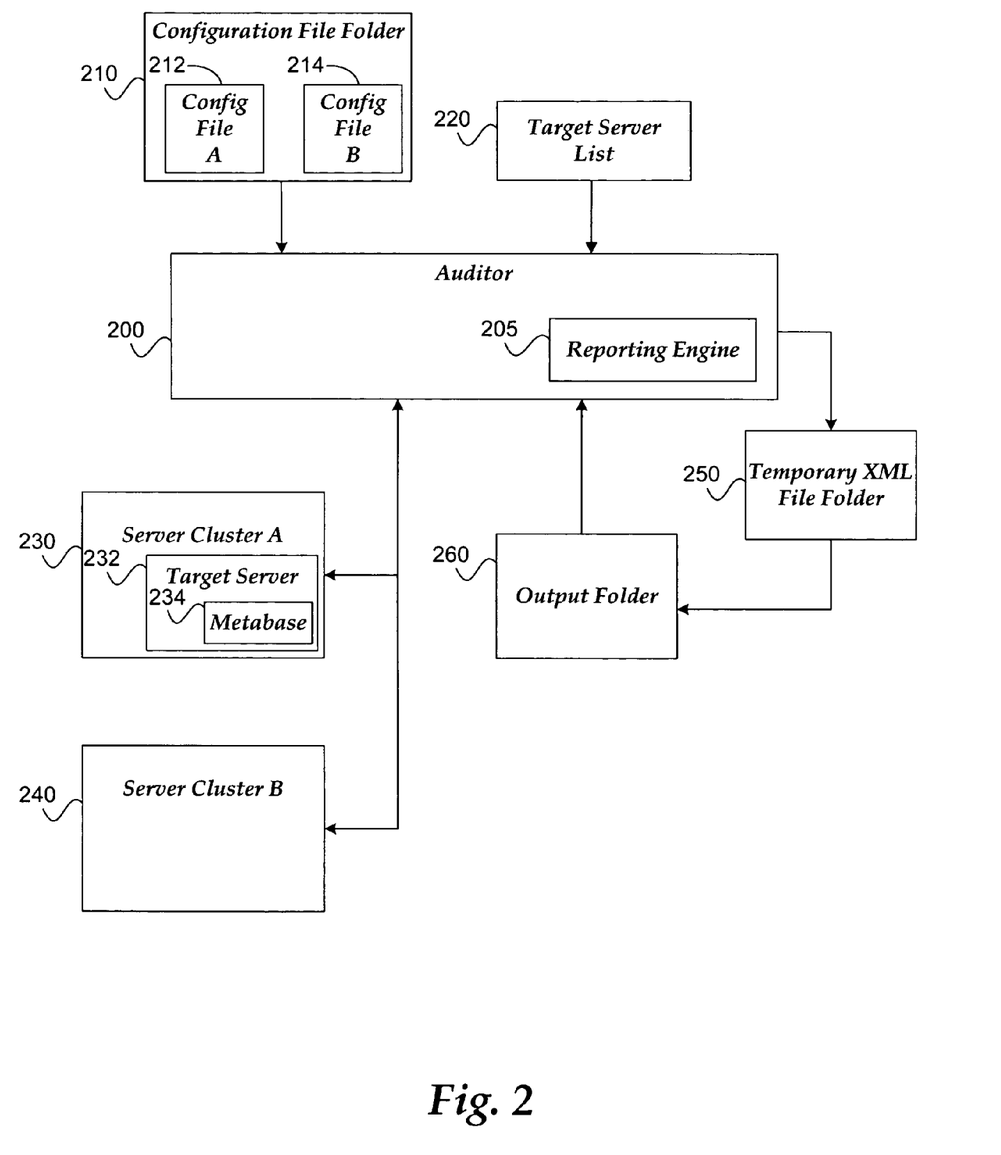
FIG. 2 is functional block diagram illustrating a system for auditing a web server configuration, in accordance with the present invention.

FIG. 2 is functional block diagram illustrating a system for auditing a web server configuration. The system includes auditor 200, configuration file folder 210, target server list 220, sever cluster A 230, server cluster B 240, XML file folder 250, and output folder 260. Auditor 200 includes reporting engine 205. Configuration file folder includes configuration file A 212 and configuration file B 214. Server cluster A 230 includes target server 232 which includes associated metabase 234. Server cluster B 240 is similarly organized but is not illustrated.

Auditor 200 communicates with configuration file folder 210, target server list 220, server cluster A 230, server cluster B 240, XML file folder 250, and output folder 260. XML file folder 250 communicates with output folder 260.

Auditor 200 includes a command line utility that accepts input parameters from the user. The user selects a configuration file (e.g., configuration file A 212) that is retrieved from configuration file folder 210 and loaded onto auditor 200. An example configuration file is shown in FIG. 3. The configuration file includes configuration settings for a set of servers and expected values of the configuration settings to determine whether the set of servers is secure. In one embodiment, the configuration file is an XML file.

The user may customize the configuration file by selecting configuration settings to be audited for a server and the expected values of the selected configuration settings. The customizable feature of the configuration file provides more flexibility to the auditing and reporting process for different configuration settings. For example, when a new product is added to a network, network security requirements may change. The configuration file can be altered to account for the change in security measures.

In another embodiment, the configuration file may include configuration settings, expected values and/or audit results stored in the configuration file for a previous audit. The user may customize the configuration file to include the configuration settings that the user wants to use for auditing the server. The user may also change the expected values of the configuration settings.

In one embodiment, one configuration file may be used to audit servers in a cluster that have matching security levels. For example, configuration file A 212 may be selected to audit a group of servers in server cluster A when servers of cluster A have a matching security level.

Target server list 220 is loaded onto auditor 200 by a command prompt or a file. The user selects a server (e.g., target server 260) or group of servers to be audited from target server list 220. The servers to be audited are selected (e.g., by server name, IP address, etc.) to initiate the audit of the selected servers. In one embodiment, target server list 220 may be accessed remotely over a network such that servers from different clusters may be audited (e.g., server cluster A 230 and server cluster B 240).

Auditor 200 loads the metabase associated with each server selected for auditing into a memory module. For example, configuration file A 212 includes configuration settings for target server 232. Thus, metabase 234 is loaded onto auditor 200 when target server 232 is selected for auditing. Metabase 234 includes metadata corresponding to the actual state of the configuration settings for target server 232. An example portion of a metabase is shown in FIG. 4. Loading metabase 234 onto auditor 200 allows for random access to the metadata.

Metadata values that correspond to the configuration settings for target server 232 are searched for and retrieved from metabase 234. In one embodiment, the metabase is an XML file. The metabase is parsed such that any XML elements that match XML elements in the corresponding configuration file are located. In one embodiment, the XML elements may not be locatable by name, and an attribute search is required to locate the element.

The metadata values are reviewed to determine which corresponding configuration settings are retrieved from the configuration file. The actual state of the configuration settings, as defined in the metadata values, is compared to the expected state of the configuration settings stored in the configuration file. If the metadata value matches the corresponding expected configuration setting value, then the server behaved as expected (i.e., the server passed). If the metadata value does not match the corresponding expected configuration setting value, then the server did not behave as expected (i.e., the server failed).

In one embodiment, it may not be possible to compare the metadata value to the expected configuration setting value. For example, the metadata value may not be a string value, or the metadata value may be a string that includes multiple values that may be ordered according to a number of different patterns. In this case, the metadata value may be retrieved and listed in the report as information about the configuration setting rather than a pass/fail result.

A temporary XML file that includes the comparison results (i.e., setting passed or failed) identified by name is written to XML file folder 250. A set of output files may be created from the temporary XML files for a server or a group of servers. In one embodiment, one output XML file is created for each server. In another embodiment, the output files are generated concurrently with the comparison of the metadata values and the expected values of the configuration settings. The output files are stored in output folder 260.

Figure 5:
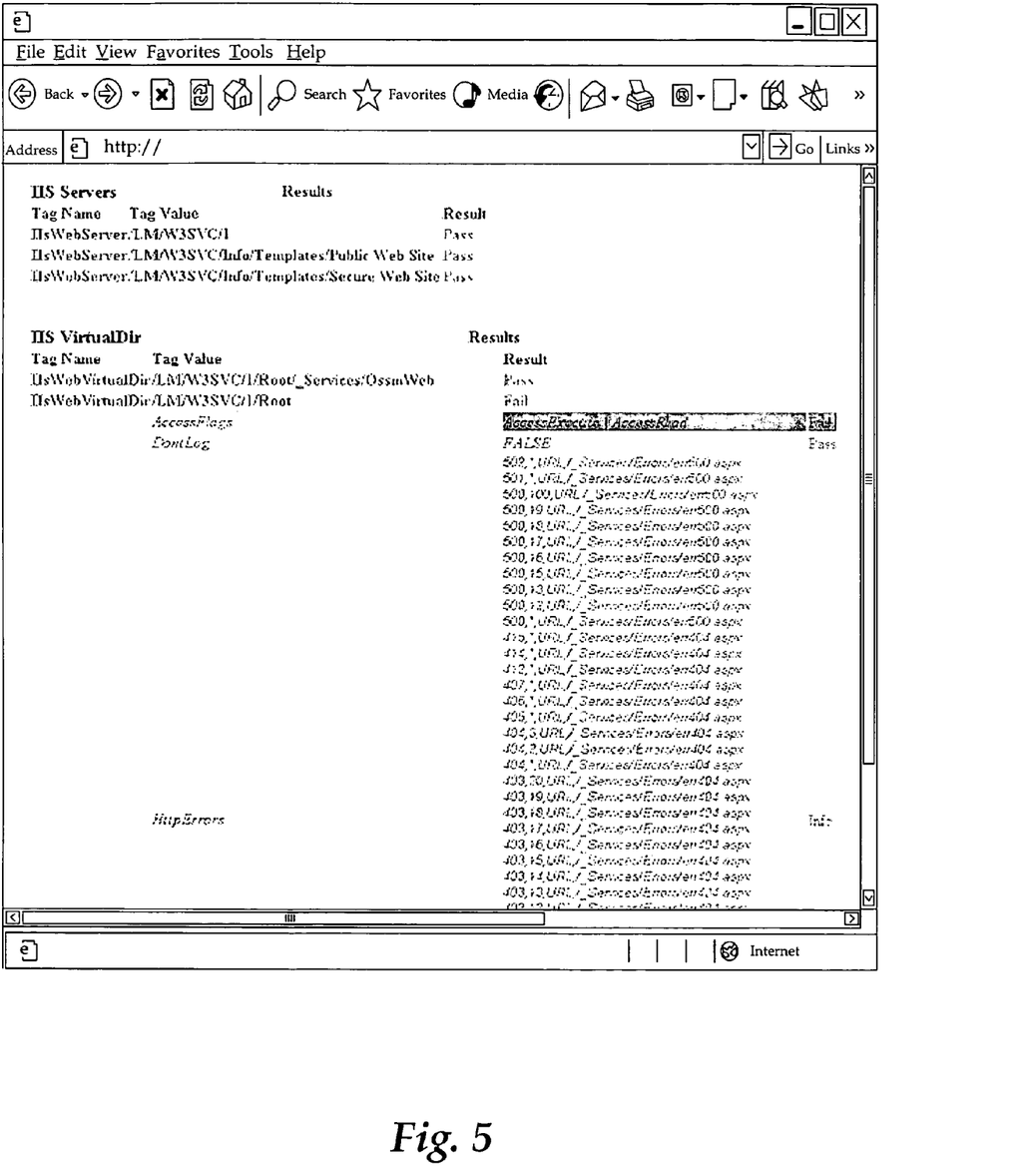
FIG. 5 is a screen shot of an example audit report for a web server configuration, in accordance with the present invention.

Reporting engine 205 generates an audit report that includes an outcome (e.g., pass/fail) entry for each configuration setting of the server depending on the comparison result. An example audit report is shown in FIG. 5. In one embodiment, the outcome is based on a Boolean logic AND comparison. Thus, if the server does not behave as expected with regard to just one configuration setting, a server failure is reported.

Reporting engine 205 parses through the output XML files stored in output folder 260 to process a report that is formatted according to the specific information in the output file. In one embodiment, the reports are generated using html. In another embodiment, the reports are dynamically altered to include all the configuration settings selected in the configuration file.

FIG. 3 is an example configuration file. The configuration file includes configuration settings 300 and corresponding expected values 310. Configuration settings 300 and corresponding expected values 310 may be established by a user (e.g., an administrator).

FIG. 4 is a portion of an example metabase. The metabase includes metadata values 400 that correspond to the actual state of the configuration settings. Some of the metabase values are not shown in their entirety (as indicated by the ellipses).

FIG. 5 is a screen shot of an example audit report for a web server configuration. The audit report indicates the pass/fail status for the configuration items. A configuration item is marked as failing when the configuration item does not match the accepted values defined in the configuration file. A configuration item is marked as information if it is not possible to compare the metadata value to the expected configuration setting value.

Figure 6:
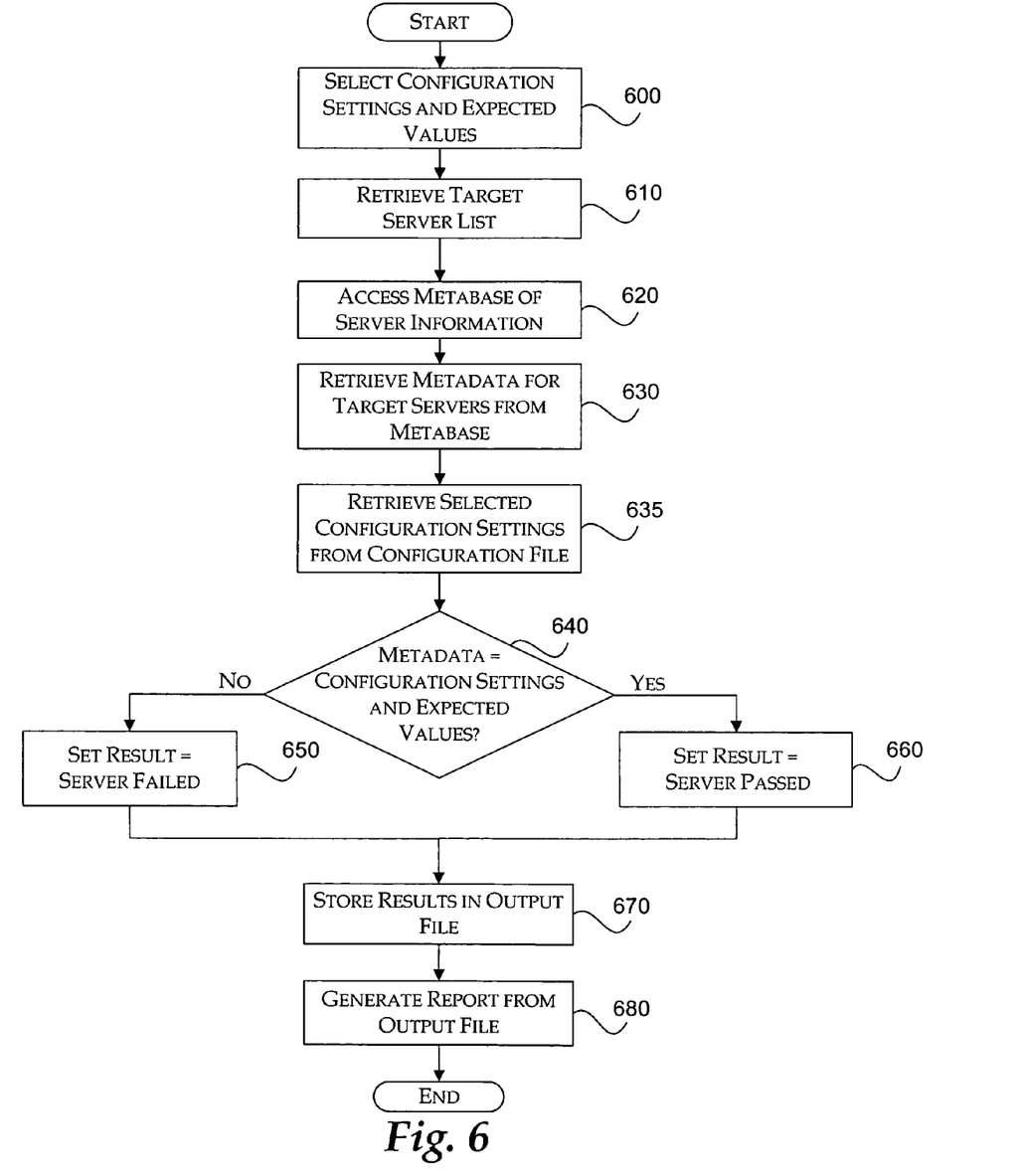
FIG. 6 is a logic flow diagram illustrating a process for auditing a web server configuration, in accordance with the present invention.

FIG. 6 is a logic flow diagram illustrating a process for auditing a web server configuration. Processing begins at a start block where a configuration file associated with a server or a group of servers to be audited is selected from a configuration file folder. Moving to block 600, the user selects configuration settings to be audited in the server and expected values for the selected configuration settings.

Advancing to block 610, the target server list is retrieved and input into the auditor. The target server list includes one or more servers that are targeted for auditing on the web server configuration.

Continuing to block 620, a metabase that includes information about the list of target servers is accessed. The metabase includes metadata corresponding to the actual state of the configuration settings for the servers in the server configuration. Proceeding to block 630, metadata values that correspond to the selected configuration settings for the target server are searched for and retrieved from the metabase. Advancing to block 635, the selected configuration settings are retrieved from the configuration file.

Moving to decision block 640, a determination is made whether the metadata values match the configuration settings and the expected values. If the metadata values do not match the configuration settings and the expected values, the servers did not behave as expected, and processing continues at block 650 where an audit result for each server is set to "server failed". If the metadata values match the configuration settings and the expected values, the server behaved as expected, and processing continues at block 660 where an audit result is set to "server passed".

As stated above, it may not be possible to compare the metadata value to the expected configuration setting value. In this case, the metadata value may be retrieved and listed in the report as "information" about the configuration setting rather than a pass/fail result.

Advancing to block 670, the results are stored in an output file. In one embodiment, the results are first stored in a temporary XML file and the output file is created from the temporary XML file.

Continuing to block 680, a report is generated from the output file. The report includes the result for each configuration setting selected for the list of target servers. In one embodiment, the report is generated using html. Processing then terminates at an end block.

It should be understood that the foregoing pertains only to the preferred embodiments of the present invention, and that numerous changes may be made to the embodiments described herein without departing from the spirit and scope of the invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for auditing a web server configuration, comprising:
    selecting a set of configuration settings and expected values associated with the configuration settings;
    selecting a target server from a group of servers on a network to be audited; wherein other servers on the network remain unselected; wherein the audit compares the configuration values currently set on the target server with the expected values; wherein the configuration values are static values;
    loading a metabase for each of the target servers to be audited; wherein the metabase includes metadata corresponding to the currently set configuration values for the selected configuration settings on the target server;
    retrieving metadata values from the metabase for the target server that correspond to the currently set configuration values for the selected configuration settings for the target server;
    comparing the metadata values associated with the target server to the expected values associated with the configuration settings; and
    producing an output based upon the comparison, wherein the output includes a representation of whether the selected configuration settings and expected values match the settings and the metadata values associated with the target server.

2. The computer-implemented method of claim 1, wherein selecting a set of configuration settings and expected values associated with the configuration settings further comprises:
    retrieving a configuration file; and
    changing a set of existing configuration settings and expected values in the configuration file.

3. The computer-implemented method of claim 1, wherein loading the metabase comprises accessing the target server and obtaining the metabase directly from the target server.

4. The computer-implemented method of claim 1, further comprising retrieving configuration settings a configuration file based on the metadata.

5. The computer-implemented method of claim 1, wherein comparing metadata determines whether the target server behaved in accordance with expected results.

6. The computer-implemented method of claim 1, wherein producing an output based upon the comparison further comprises generating an html report.

7. The computer-implemented method of claim 1, wherein the output includes a pass representation when the selected configuration settings and expected values match the settings and values associated with the target server.

8. The computer-implemented method of claim 1, wherein the output includes a fail representation when the selected configuration settings and expected values do not match the settings and values associated with the target server.

9. The computer-implemented method of claim 1, wherein the output includes an information representation when the settings and values associated with the target server cannot be compared to the selected configuration settings and expected values.

10. A system for auditing a web server configuration, comprising:
    a target server in the web server configuration that is arranged to be audited for configuration settings, wherein the target server includes metadata for settings and values associated with the configuration settings for the target server; wherein the target server is selected by a user from a group of servers on a network and wherein at least one of the active servers on the network remains unselected;
    a configuration file comprising a set of configuration settings and expected values for the target server;
    an auditor that is arranged to: load the metadata values from the target server that includes currently set configuration values for the configuration settings and compare each expected value within the configuration settings with the corresponding currently set configuration value loaded from the metadata; and
    a reporting engine that is arranged to produce an output based upon the comparison, wherein the output includes a representation of whether the selected configuration settings and expected values match the settings and the currently set configuration values associated with the target server.

11. The system of claim 10, wherein the configuration file is an XML file, and wherein the auditor searches for and retrieves the metadata from an XML metabase by parsing the metabase such that any XML nodes in the metabase that match XML nodes in the configuration file are located.

12. The system of claim 10, wherein the set of configuration settings and expected values for the target server is selected by a user.

13. The system of claim 10, wherein the target server is selected for auditing from a target server list.

14. The system of claim 10, wherein the auditor retrieves the configuration settings from the configuration file based on the metadata.

15. The system of claim 10, wherein the output includes a pass representation when the configuration settings and expected values match the settings and values associated with the target server.

16. The system of claim 10, wherein the output includes a fail representation when the selected configuration settings and expected values do not match the settings and values associated with the target server.

17. The system of claim 10, wherein the output includes an information representation when the settings and values associated with the target server cannot be compared to the selected configuration settings and expected values.

18. The system of claim 10, wherein the reporting engine produces an output based upon the comparison by generating an html report.

19. The system of claim 10, wherein the auditor is arranged to forward the results of the comparison to an output XML file such that the reporting engine generates an HTML report that is formatted based on the output XML file.

20. A computer-readable storage medium having computer instructions for auditing a web server configuration, comprising:
    selecting a set of configuration settings and expected values associated with the configuration settings;
    selecting a target server from a group of servers on a network to be audited; wherein other servers on the network remain unselected; wherein the audit compares the configuration values currently set on the target server with the expected values;
    loading a metabase from the target server to be audited; wherein the metabase includes metadata corresponding to the currently set configuration values for the selected configuration settings;
    retrieving metadata values from the metabase that correspond to the currently set configuration values for the selected configuration settings;
    comparing the metadata values associated with the target server to the expected values; and
    producing an output based upon the comparison concurrently with the comparison, wherein the output includes a representation of whether the selected configuration settings and expected values match the settings and the metadata values associated with the target server.

21. The computer-readable storage medium of claim 20, further comprising generating an html report of the comparison.

22. The computer-readable storage medium of claim 20, further comprising retrieving the configuration settings from a configuration file based on the metadata.

* * * * *